Nov. 3, 1936.  D. H. GASTON  2,059,861

RETAINING COLLAR FOR FOOD CABINETS

Filed Jan. 6, 1934

Inventor:
Donald H. Gaston,
by Harry E. Dunham
His Attorney.

Patented Nov. 3, 1936

2,059,861

UNITED STATES PATENT OFFICE 2,059,861

RETAINING COLLAR FOR FOOD CABINETS

Donald H. Gaston, Fort Wayne, Ind., assignor to General Electric Company, a corporation of New York Application January 6, 1934, Serial No. 705,557

8 Claims. (Cl. 220—85)

My invention relates to food cabinets and the like and, particularly, to devices for maintaining food containers in position within such cabinets.

In food preserving cabinets and, particularly, in such cabinets arranged for the dispensing of frozen foods, such as ice cream, difficulty is frequently encountered because of the spilling of food on the outside of the food container between the container and the cabinet walls. This creates an unsanitary condition and also results in loss of food. The probability of spilling food is increased in many instances, because the food containers are not held securely in place but may move when food such as ice cream is being removed therefrom. Retaining collars have been proposed which hold the containers in place and cover the opening between the container and the cabinet walls; but these prevent circulation of cold air over the top of the container and softening of frozen foods results.

It is an object of my invention to provide a collar for preventing the spilling of foods between the food container and the walls of the food preserving compartment which shall retain the food container in position and which shall also permit the circulation of air about the top of the food container and around the chilled compartment.

A further object of my invention is to provide a collar for retaining a food container in position within a chilled compartment while food is being taken therefrom which device shall be of simple and rugged construction and shall be readily removable.

Further objects and advantages of my invention will become apparent as the following description proceeds, and the features of novelty which characterize my invention will be pointed out with particularity in the claims annexed to and forming a part of this specification.

Figure 1:
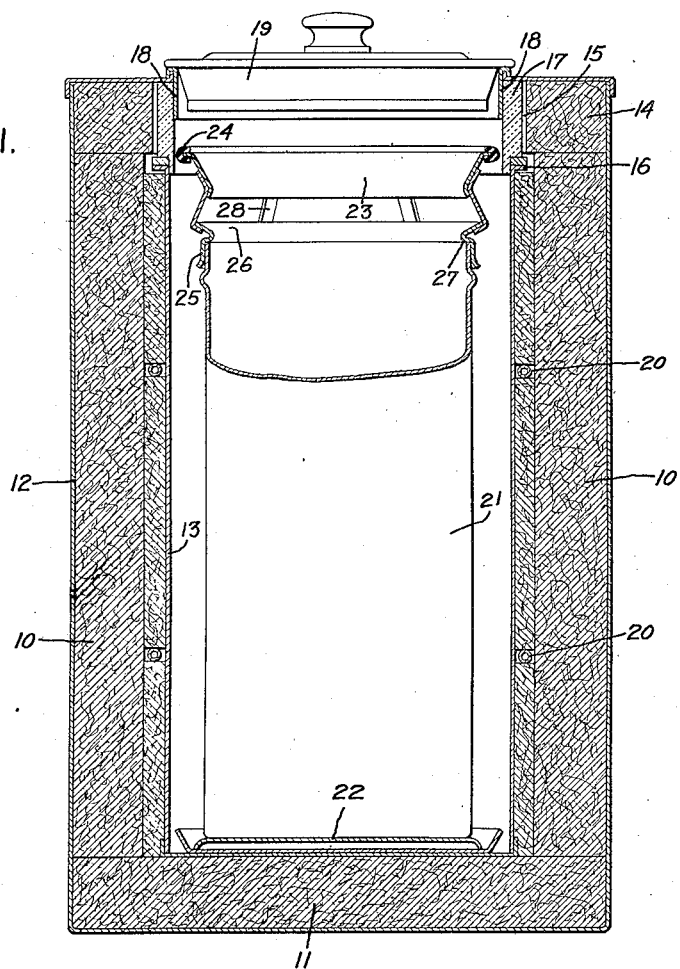
Figure 2:
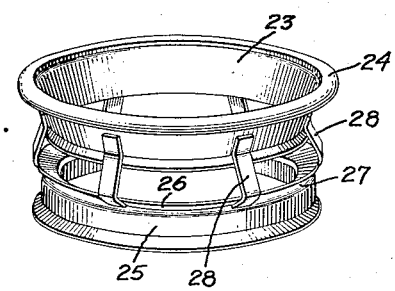

For a better understanding of my invention reference may be had to the accompanying drawing in which Fig. 1 is a sectional elevation of an ice cream cabinet and an ice cream can provided with a retaining collar embodying my invention, and Fig. 2 is a perspective view of the retaining collar shown in Fig. 1.

Referring now to Fig. 1, I have shown an ice cream cabinet comprising thermally insulated side and bottom walls 10 and 11 respectively retained between outer and inner sheet metal walls 12 and 13 respectively. The cabinet is provided with a top wall 14 within which is a circular opening 15 provided to give access to the ice cream can or other food container within the cabinet. Within the opening 15 and resting on a flange 16 on the inner wall 13 is a circular liner 17 of insulating material provided with a metallic collar 18 at the upper portion thereof. An insulating cover 19 fitting within the collar 18 is provided to close the opening 15. Within the insulated side walls 10 and in heat exchange relation with the inner wall 13 are arranged conduits 20 which are utilized to maintain the compartment within the cabinet at a predetermined low temperature, by connecting them to a refrigerating machine, or in any other suitable manner. An ice cream can or other food container 21 is arranged within the compartment and rests on a supporting tray 22 on the bottom wall thereof. In order to prevent displacement of the ice cream container when ice cream is being dipped therefrom, it is necessary to provide some arrangement to position the container with respect to the cabinet walls. It is also desirable to prevent spilling of ice cream between the container and the cabinet, and at the same time to provide for a circulation of cold air over the top of the container to prevent softening of the top of the ice cream therein.

In accordance with my invention I provide a retaining collar comprising an upwardly and outwardly flared deflecting ring fitting the opening of the cabinet and a supporting ring spaced from the deflecting ring to permit circulation of air therebetween and for securing the collar to the food container.

Referring again to the drawing, in Figs. 1 and 2 I have shown a retaining collar including an upwardly and outwardly flared deflecting ring 23 having an outer diameter nearly equal to that of the liner 17. The outer edge of the ring 23 may be protected by a bead 24 of rubber or other suitable material which will prevent rattling when food is being taken from the container 21. In order to support the ring 23 on the container 21, I provide a ring 25 having an upwardly and outwardly flared flange 26 and arranged to fit over the top of the can 21 with a shoulder 27 formed at the base of the flange 26 resting on the top edge of the container. The ring 23 is secured to the flange 26 by a plurality of spaced supports or brackets 28 which provide ventilating openings between the ring 23 and the container and allow air to circulate through the retaining collar between the chilled compartment and the container. The inside diameter of the ring 23 is considerably less than the outside diameter of the flange 26. By this construction, the spilling of ice cream or other food into the compartment from the container is effectively prevented, while at the same time cold air may circulate freely over the ice cream at the top of the can and prevent the softening thereof.

A retaining collar constructed in accordance with my invention will be provided for each of the compartments or holes of an ice cream cabinet. When a can of ice cream has been placed within the cabinet a collar is fitted to the top of the can. The outer edge of the deflecting ring 23 will then be in position within the liner 17 and, since the ring 25 fits securely over the edge of the can 21, the can will be held firmly in place and will not move around or rattle when ice cream is being removed therefrom. Any particles of ice cream or food which fall back through the compartment opening toward the can will be deflected by the ring 23 and will fall into the ice cream can instead of falling between the can and the compartment walls. Cold air from the compartment will readily circulate over the food within the container 21 since the air may pass between the ring 23 and the container, and the softening of the food such as ice cream will thereby be prevented.

It will be apparent from the foregoing that I have provided a simple and rugged collar for retaining ice cream cans or similar food containers within cooling compartments, which collar will prevent moving of the containers and spilling of food between the containers and the walls of the compartments and will permit a free circulation of air over the food within the containers.

While I have shown and described my invention as applied to an ice cream cabinet, other modifications will be apparent to those skilled in the art and I do not desire my invention to be limited to the specific embodiment shown and described, and I intend in the appended claims to cover all modifications within the spirit and scope of my invention.

What I claim as new and desire to secure by Letters Patent of the United States, is:

1. A collar for positioning a food container within a refrigerated chamber, said collar comprising an outwardly and upwardly flared ring, and means for providing ventilating openings between said ring and a food container and for supporting said ring on said food container.

2. A collar for positioning a food container within a refrigerated chamber, said collar comprising an outwardly and upwardly flared ring, and means including a second ring having an upwardly and outwardly extending flange and providing ventilating openings between said first named ring and said second ring for supporting said first named ring on said food container.

3. A collar for positioning a food container within a refrigerated chamber, said collar comprising an outwardly and upwardly flared ring, and means including a second ring having spaced brackets secured thereto for providing ventilating openings between said flared ring and said food container and for supporting said flared ring on said food container.

4. A food dispensing cabinet including a chamber having side and bottom walls, a food container arranged within said chamber and spaced from the side walls thereof, an upwardly and outwardly flared deflecting member for said food container, and means for providing ventilating openings between said container and said deflecting member and for supporting said deflecting member on said container.

5. A food dispensing cabinet including a chamber having side and bottom walls, a cylindrical food container arranged within said chamber and spaced from the side walls thereof, an upwardly and outwardly flared deflecting ring for said food container, and means including spaced supports for providing ventilating openings between said container and said deflecting ring and for supporting said deflecting ring on said container.

6. A food dispensing cabinet including a chamber having side and bottom walls and a circular opening at the top thereof, a cylindrical food container arranged within said chamber and spaced from the side walls thereof, an upwardly and outwardly flared deflecting ring arranged within the opening in said chamber, a second ring having an upwardly and outwardly extending flange and engaging said food container, and means for providing ventilating openings between said deflecting ring and said second ring and for supporting said deflecting ring above said second ring.

7. A collar for positioning a food container within a refrigerated chamber, said collar comprising an outwardly and upwardly flared ring, and means having ventilating openings therein between said ring and said food container for supporting said ring on said food container.

8. A food dispensing cabinet including a chamber having side and bottom walls, a food container arranged within said chamber and spaced from the side walls thereof, an upwardly and outwardly flared deflecting member for said food container, and means having ventilating openings between said container and said deflecting member for supporting said deflecting member on said container.

DONALD H. GASTON.